Jan. 30, 1951  W. E. NEWBY  2,539,460
WINDLESS AUTO ARM SIGNAL
Filed June 4, 1947  2 Sheets-Sheet 1

INVENTOR.
WARNER E. NEWBY
BY *Victor J. Evans & Co.*
ATTORNEYS

Jan. 30, 1951 W. E. NEWBY 2,539,460
WINDLESS AUTO ARM SIGNAL
Filed June 4, 1947 2 Sheets-Sheet 2
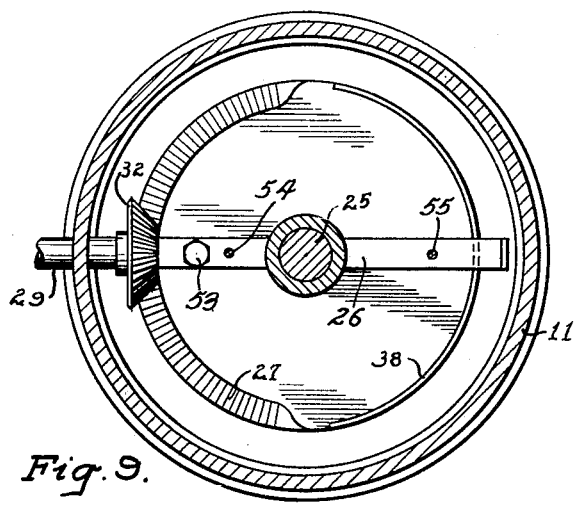
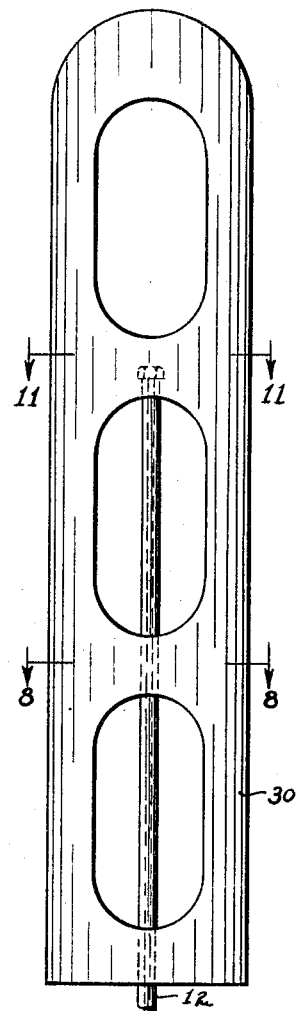
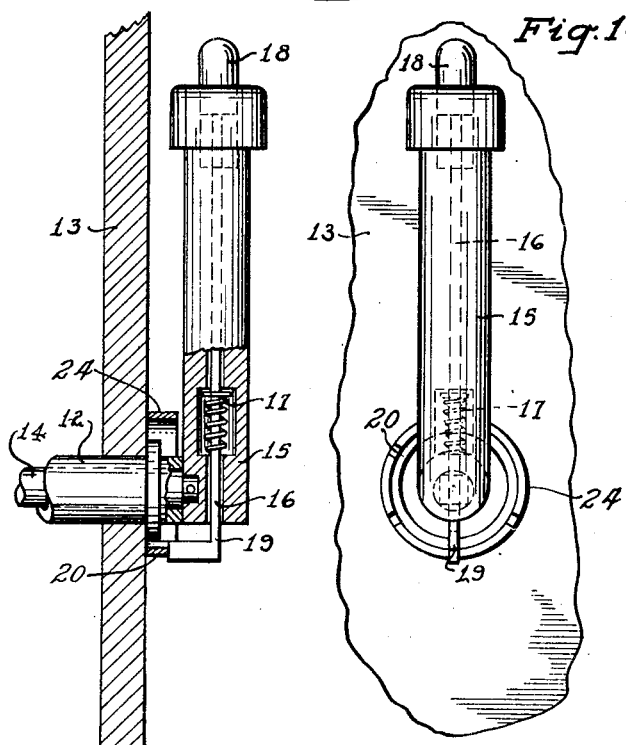
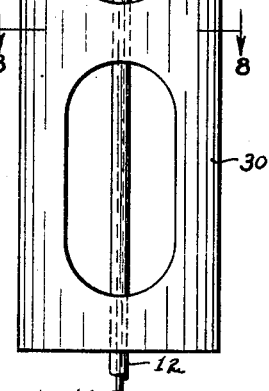
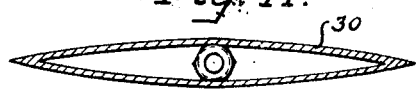
INVENTOR.
WARNER E. NEWBY
BY Victor J. Evans & Co.
ATTORNEYS Patented Jan. 30, 1951

2,539,460

UNITED STATES PATENT OFFICE 2,539,460

WINDLESS AUTO ARM SIGNAL

Warner E. Newby, Vallejo, Calif.

Application June 4, 1947, Serial No. 752,331

3 Claims. (Cl. 116—51)

The present invention relates to a signalling device and it consists in the combination, constructions and arrangements of parts herein described and claimed.

Generally, the invention comprises a signalling device which includes a two-part housing adapted to be attached to the side of a vehicle and the inner part of the housing being provided with an arm adapted to extend within the vehicle for the operation of the signalling arm which is carried by the movable part of the housing. Suitable gearing is provided within the housing whereby the signal arm, which is normally adapted to lie in the same plane as the side of the vehicle, may be moved to an angular position and at the same time be turned out of its original plane whereby it may more easily be viewed by vehicles traveling to the rear of the vehicle carrying the signalling device.

It is, accordingly, an object of the invention to provide a signalling device having a signal arm which is normally in the same plane as the vehicle but which may be moved to a plane at right angles to the normal plane when a signal is given with said arm.

A further object of the invention is the provision of novel gearing means whereby to effect the results above set forth.

Another object of the invention is the provision of novel means for illuminating the signal arm when same is in signalling position.

Other and further objects of the invention will become apparent from a reading of the following specification taken in conjunction with the drawings, in which:

Figure 6 is a sectional view taken along line 6—6 of Figure 3,

Figure 7 is an enlarged view of a signalling arm forming a part of the invention, Figure 8 is a sectional view taken along line 8—8 of Figure 7, Figure 9 is a vertical elevational view, partly broken away, of an element of the invention, Figure 10 is a side elevational view of the device disclosed in Figure 9, and Figure 11 is an enlarged sectional view taken along line 11—11 of Figure 7.

Figure 1:
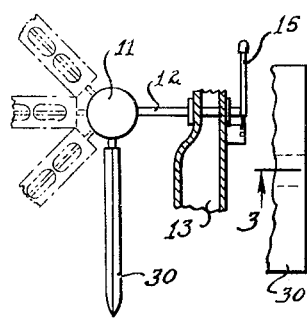
Figure 1 is a side elevational view of an embodiment of the invention.
Figure 2:
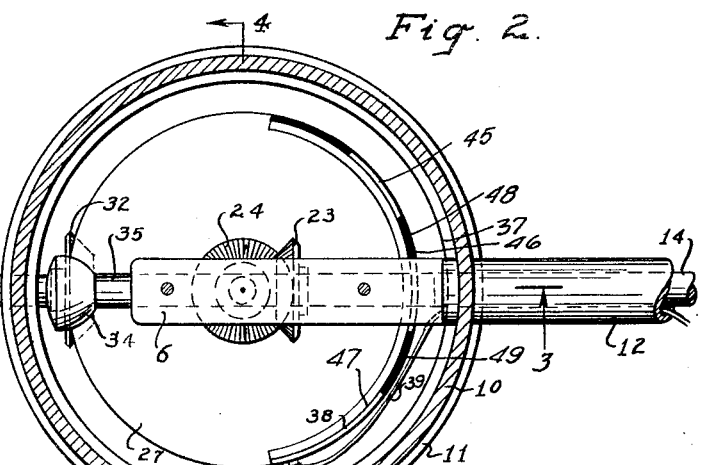
Figure 2 is a sectional view taken along line 2—2 of Figure 3.

Referring more particularly to the drawings, there is shown therein a signalling device having a housing composed of an inner stationary base portion 10 and an outer movable portion or cover 11. The base is adapted to be attached to the sides of a vehicle and has extended therefrom a handle housing 12 adapted to protrude through the wall 13 of a vehicle. A shaft 14 is revolubly mounted within the handle housing 12 and is provided with an operating handle 15 at its inner end.

The operating handle 15 has slidably mounted therein a shaft 16 which is normally held in an upward position by means of a spring 17 and is provided with a projecting knob or button 18. The opposite end of the shaft 16 is formed with a key 19 adapted to engage the notches 20 formed in a circular member 21 which is attached to the wall 13 of the vehicle.

The outer end of the shaft 14 is journalled in the base 10 in a bearing 22 and has a bevel gear 23 mounted on its inner end which meshes with a bevel gear 24 freely rotatable on a shaft 25 that is mounted centrally of the housing in a boss 5 of a base member 6 being held stationary by a pin 7. The bevel gear 24 on the shaft 25 rotates a U-shaped yoke 26 which is journaled on the shaft 25 through a lower arm 8 of the yoke and a large bevel gear 27 positioned in the yoke is keyed by a pin 28 to the shaft 25 whereby the gear 27 remains stationary in the housing. The beveled gear 24 is secured to the arm 8 of the yoke 26 by welds 56 or any other suitable means.

Mounted in the movable portion 11 of the housing is the shaft 29 of a signalling arm 30 and the inner end of the shaft 29 is keyed, as indicated at 31, to a bevel gear 32 which meshes with the bevel gear 27.

Figure 3:
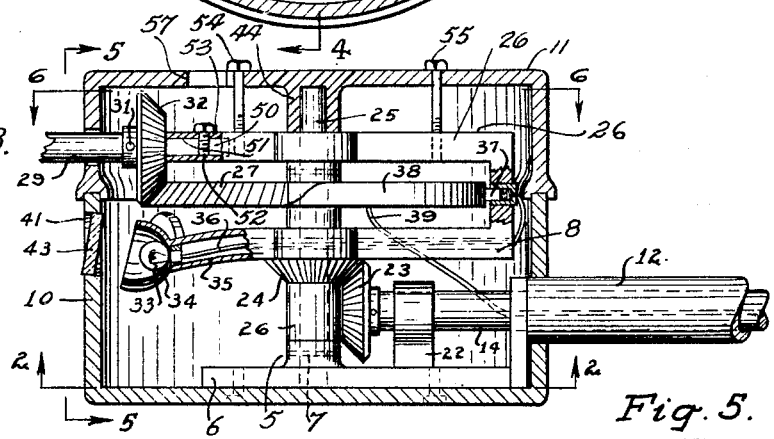
Figure 3 is a sectional view taken along line 3—3 of Figure 2.
Figure 4:
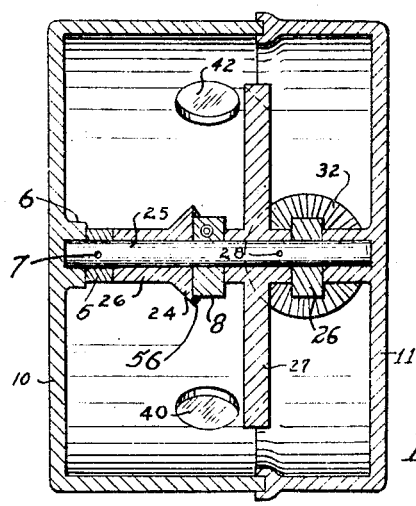
Figure 4 is a sectional view taken along line 4—4 of Figure 2.
Figure 5:
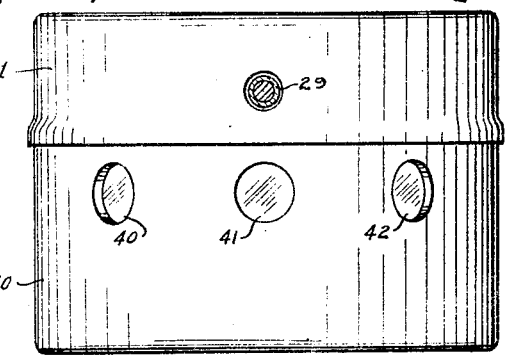
Figure 5 is a sectional view taken along line 5—5 of Figure 3.

The shaft 29 is provided with an extended end 50 that is journaled in the end 51 of the upper arm of the yoke 26 and the end 50 is provided with an annular groove 52 into which the end of a set screw 53 extends thereby retaining the shaft with the gear 32 in mesh with the gear 27. The cover 11 is secured to the yoke 26 by bolts 54 and 55, as shown in Figure 3, and the cover is provided with an opening 57 to provide access to the bolt 53.

A lamp 33 is provided with a suitable reflector 34 and is mounted at the end of a tubular member 35 containing a wire 36 for supplying current to the lamp. The other end of the wire 36 terminates in a boss contact 37 which is adapted to bear against the contact segment 38 carried by the bevel gear 27. The segment 38 is connected through a wire 39 which passes through the handle housing 12 to a source of current within the vehicle. Suitable openings 40, 41 and 42 are provided within the housing member 10 and such openings are provided with lenses as, for example 43. The upper end of the shaft 25 is journaled in a hub 44 of the cover 11.

In the operation of the device it will be apparent that the signalling arm 30 normally lights at the side of and in the same plane as the side of the car or other vehicle upon which the device may be utilized.

The shaft 14 is rotated by the handle 15 and as the shaft turns the gear 23 on the inner end thereof rotates the yoke 26 through the gear 24 and as the yoke turns it carries the gear 32 over the gear 27 thereby rotating the shaft 29, and as the shaft 29 turns the signal arm 30 is first turned from the position shown in full lines in Figure 1 to a broad side position as indicated by the dot and dash lines and as the cover moves with the shaft 29 and yoke 26 the signal shaft is actuated to the different dot and dash positions shown in Figure 1. In this movement the light 33 which is carried by the end of the yoke follows the gear 32 and signal shaft 29 with the contact 37 engaging the different contact sections 45, 46 and 47 of the segment 38. These sections are separated by insulating material 48 and 49.

When it is desired to signal with the signalling arm it is only necessary to move the handle 15 from its normal position to a preselected notch 20 whereupon the button 18 may be depressed and the key 19 will engage in one of the notches 20. During this operation the lamp will be lighted and will throw a beam through one of the windows 40, 41 or 42 upon the assumed position of the signalling arm 30, which latter will have taken a position in a plane at right angles to its original position due to the fact that the bevel gear 32 will have rotated over the bevel gear 27. It will thus be seen that various signals may be given with the arm and that proper illumination therefor may be had during the hours of darkness and that when not in use, the signalling arm will lie in a plane where it will offer the least wind resistance to the forward motion of the vehicle to which it is attached.

While but one form of the invention has been shown and described herein, it will be readily apparent to those skilled in the art that many minor modifications may be made without departing from the spirit of the invention or the scope of the appended claims.

I claim:

1. In a motor vehicle signal, the combination which comprises a stationary cup like base mounted on the side of a vehicle, a stationary centrally disposed shaft positioned in the base, a cover pivotally mounted on the shaft and rotatably slidable on the base, an operating shaft extended from the base through the wall of the vehicle, a handle on the inner end of the operating shaft, a signal shaft rotatably mounted in the cover and extended therefrom, a signal on the outer end of said signal shaft, a yoke in the casing rotatably mounted on the said centrally disposed shaft, means actuating the yoke by the operating shaft, means turning the signal through the signal shaft by the yoke as the yoke is actuated, and means lighting the signal.

2. In a motor vehicle signal, the combination which comprises a stationary cup like base mounted on the side of a vehicle, a stationary centrally disposed shaft positioned in the base, a cover pivotally mounted on the shaft and rotatably slidable on the base, an operating shaft extended from the base through the wall of the vehicle, a handle on the inner end of the operating shaft, a signal shaft rotatably mounted in the cover and extended therefrom, a signal on the outer end of said signal shaft, a yoke in the casing rotatably mounted on the said centrally disposed shaft, means actuating the yoke by the operating shaft, and means turning the signal through the signal shaft by the yoke as the yoke is actuated.

3. In a motor vehicle signal, the combination which comprises a stationary cup like base mounted on the side of a vehicle, a stationary centrally disposed shaft positioned in the base, a cover pivotally mounted on the shaft and rotatably slidable on the base, an operating shaft extended from the base through the wall of the vehicle, a handle on the inner end of the operating shaft, a signal shaft rotatably mounted in the cover and extended therefrom, a signal on the outer end of said signal shaft, a yoke in the casing rotatably mounted on the said centrally disposed shaft, a beveled gear mounted on the shaft and positioned to actuate the yoke, a beveled gear on the end of the operating shaft meshing with the beveled gear for actuating the yoke, a beveled gear fixedly mounted on the said stationary centrally disposed shaft, and a beveled gear on the inner end of the signal shaft meshing with the gear on the centrally disposed shaft whereby as the operating shaft is turned by the handle the signal will be rotated and the cover turned from one position to another.

WARNER E. NEWBY.

REFERENCES CITED

The following references are of record in the file of this patent:

UNITED STATES PATENTS

| Number | Name | Date |
| --- | --- | --- |
| 1,439,122 | Riblet | Dec. 19, 1922 |